United States Patent
Pantino et al.

(10) Patent No.: US 10,196,013 B2
(45) Date of Patent: Feb. 5, 2019

(54) DEVICE AND METHOD FOR SECURING A WIRE ASSEMBLY

(71) Applicant: YAZAKI NORTH AMERICA, INC., Canton, MI (US)

(72) Inventors: Jesus Joel Pantino, Belleville, MI (US); Pilardo De Las Graciano, Windsor (CA)

(73) Assignee: YAZAKI NORTH AMERICA, INC., Canton, MI (US)

( * ) Notice: Subject to any disclaimer, the term of this patent is extended or adjusted under 35 U.S.C. 154(b) by 77 days.

(21) Appl. No.: 15/318,282

(22) PCT Filed: Nov. 11, 2015

(86) PCT No.: PCT/US2015/060156
§ 371 (c)(1),
(2) Date: Dec. 12, 2016

(87) PCT Pub. No.: WO2017/082893
PCT Pub. Date: May 18, 2017

(65) Prior Publication Data
US 2017/0349121 A1  Dec. 7, 2017

(51) Int. Cl.
*F16L 3/08* (2006.01)
*B60R 16/02* (2006.01)
(Continued)

(52) U.S. Cl.
CPC ............ *B60R 16/0215* (2013.01); *F16B 2/06* (2013.01); *F16L 3/1058* (2013.01); *F16L 3/12* (2013.01); *H02G 3/32* (2013.01)

(58) Field of Classification Search
USPC ......................................................... 248/74.2
See application file for complete search history.

(56) References Cited

U.S. PATENT DOCUMENTS 4,822,224 A   4/1989 Carl et al.
5,390,882 A   2/1995 Lee et al.
(Continued)

FOREIGN PATENT DOCUMENTS

JP   2009-065798   3/2009

OTHER PUBLICATIONS

International Search Report and Written Opinion for International Application No. PCT/US2015/060156, dated Jan. 22, 2016, 8 pages.

*Primary Examiner* — Monica E Millner
(74) *Attorney, Agent, or Firm* — Foley & Lardner LLP

(57) ABSTRACT

A wire assembly securement apparatus comprises a retainer body and first and second elongated arms. The retainer body is configured to attach, via a plurality of binding attachments, to a wire assembly. The first and second elongated arms are structured to extend from the retainer body and facilitate, via the plurality of binding attachments, attachment of the retainer body to the wire assembly. A retainer portion has a passage formed therein which is configured to a protrusion, such as a mounting stud. In various embodiments, first and second capture flanges extend via the passage and are configured to secure the securement apparatus to the protrusion. In various embodiments, the retainer body and first and second elongated arms are structured to attach to the wire assembly via a plurality of types of binding attachments.

20 Claims, 4 Drawing Sheets

(51) Int. Cl.
*F16B 2/06* (2006.01)
*F16L 3/10* (2006.01)
*F16L 3/12* (2006.01)
*H02G 3/32* (2006.01)

(56) References Cited

U.S. PATENT DOCUMENTS

| | | | |
|---|---|---|---|
| 5,423,647 A * | 6/1995 | Suzuki | B60R 16/0215 411/433 |
| 5,760,338 A * | 6/1998 | Suzuki | B60R 16/0215 174/135 |
| 6,042,062 A * | 3/2000 | Sugiyama | B60R 16/0215 174/72 A |
| 6,610,929 B1 * | 8/2003 | Motokawa | B60R 16/0207 174/135 |
| 7,128,514 B1 | 10/2006 | Le Beau | |
| 7,141,737 B2 * | 11/2006 | Nakamura | B60R 16/0215 174/72 A |
| 7,533,853 B2 * | 5/2009 | Ogawa | B60R 16/0215 248/73 |
| 8,625,952 B2 | 1/2014 | Hernandez et al. | |
| 2002/0129961 A1 * | 9/2002 | Baker | B60R 16/0215 174/72 A |
| 2007/0187144 A1 * | 8/2007 | Kato | B60R 16/0215 174/72 A |
| 2014/0217246 A1 | 8/2014 | Loewe et al. | |

\* cited by examiner

DEVICE AND METHOD FOR SECURING A WIRE ASSEMBLY

TECHNICAL FIELD

Embodiments of the present invention relate generally to wire assemblies. In particular, the embodiments of the present invention relate to a device and method for securing a wire assembly.

BACKGROUND

A wire assembly (e.g., a wire harness, cable harness, etc.) typically includes wires configured for electronic capabilities, such as the transmission of signals or provision of electric power. In some applications, the respective wires may vary in length spanning distances up to several meters or throughout a vehicle (e.g., an automobile, aircraft, spacecraft, ship, etc.). Accordingly, a wire assembly may include a clip used to bind or gather the wires to secure the wires, prevent degradation of wire integrity, reduce human contact, etc. The clip may attach the wire assembly to a supporting structure, such as a stud. An ongoing need exists for improved designs that allow for such wire assemblies to be easily and reliably mounted to such supporting structures.

Such conventional clips are not without limitations. For example, conventional clips limit the options by which a wire assembly can be attached to a stud and fail to provide temporary retention features to allow the wire assembly to be attached to a stud by single hand operation. However, the inventors have identified various problems and difficulties that occur in securing a wire assembly to a protrusion coupled to a vehicular surface. The inventors have solved such obstacles achieved by developing an unconventional solution that secures a wire assembly to a protrusion coupled to a vehicular surface.

SUMMARY OF THE INVENTION

In an example embodiment, wire assembly securement apparatus comprises a retainer body and first and second elongated arms. The retainer body is configured to attach, via a plurality of binding attachments, to a wire assembly. The first and second elongated arms are structured to extend from the retainer body and facilitate, via the plurality of binding attachments, attachment of the retainer body to the wire assembly. A retainer portion has a passage formed therein which is configured to a protrusion. The securement apparatus further comprises first and second capture flanges that extend via the passage and are configured to secure the securement apparatus to the protrusion.

In another example embodiment, a wire assembly securement apparatus comprises retainer body and first and second elongated arms. The retainer body is configured to attach, via a plurality of binding attachments, to a wire assembly. The first and second elongated arms structured to extend from the retainer body and facilitate, via the plurality of binding attachments, attachment of the retainer body to the wire assembly. A retainer portion has a passage formed therein which is configured to a protrusion. The retainer body and first and second elongated arms are structured to attach to the wire assembly via a plurality of types of binding attachments including a first type of attachment and a secondary type of attachment. In various embodiments, the first type of attachment is a tie wrap attachment and wherein the second type of attachment is a tape attachment.

These and other features of the implementations described herein, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Referring to the figures generally, an apparatus (a clip, strain relief assembly, etc.) for securing a wire assembly to a protrusion coupled to (e.g., extending from) a surface is described. The surface may include a surface of, or corresponding to, a vehicle operable via at least one of a motor (e.g., an electric motor), engine (e.g., an internal combustion engine, gasoline engine, jet engine, steam engine, hybrid engine, etc.), propeller, rail, road, air, water, etc. Accordingly, the apparatus 10 may be utilized interior to the vehicle. Alternatively or additionally, the apparatus 10 may be utilized exterior to the vehicle.

Figure 1A:
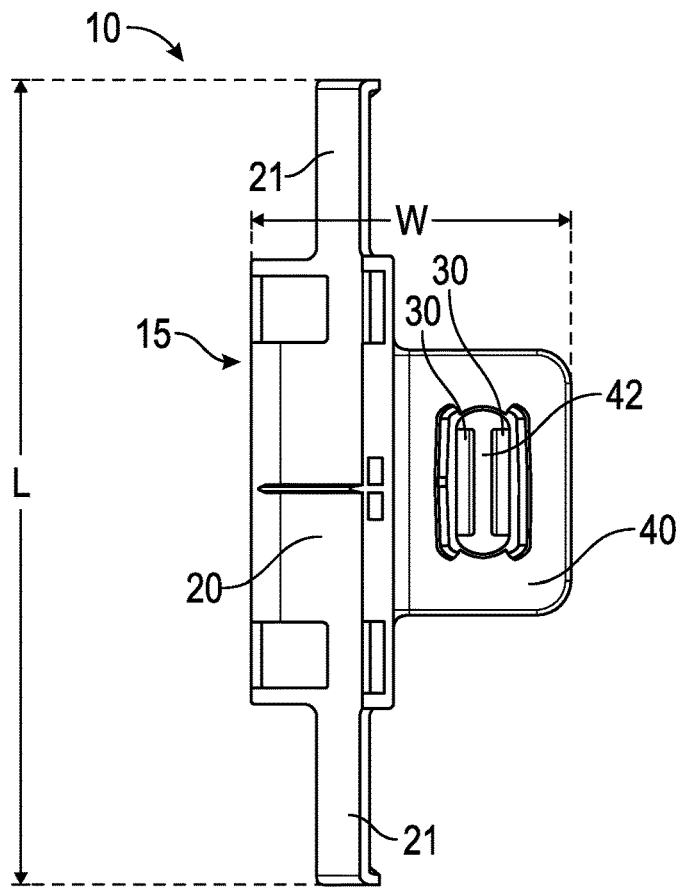
FIG. 1A illustrates a frontal view of an apparatus according to an example embodiment.

Referring to FIG. 1A, a frontal view of an apparatus 10 is illustrated according to an example embodiment. As depicted, the apparatus 10 may include a retainer body 15, a concave surface 20, first and second elongated arms 21, first and second capture flanges 30, a retainer portion 40, and an ovate passage 42. The retainer body 15 is configured to retain (e.g., accommodate, hold, receive, etc.) a wire assembly (e.g., a wire harness or other assembly comprising one or more wires). The retainer body 15 may be made of material such as a plastic or composite material. In the depicted embodiment, for example, the retainer body 15 comprises an injection molded non-conductive plastic and measures a length (L) and width (W), configured to accommodate the various assemblies (e.g., wire assemblies) as described herein. In other embodiments, the retainer body 15 may be made from any suitable material and/or combinations of materials.

Figure 1B:
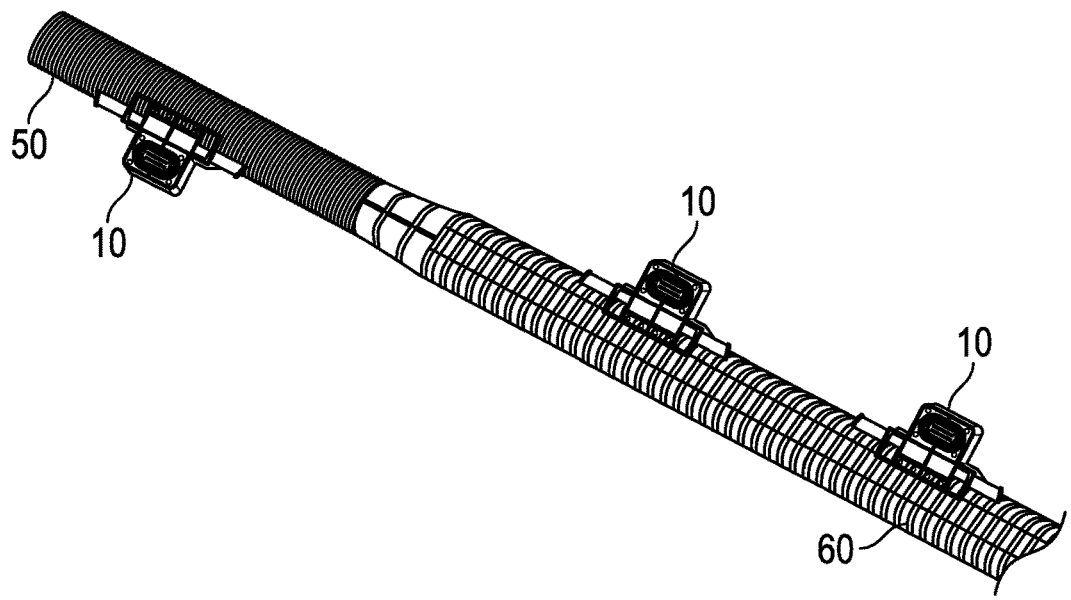
FIG. 1B illustrates a side perspective view of an apparatus attached to a wire assembly according to an example embodiment.
Figure 1C:
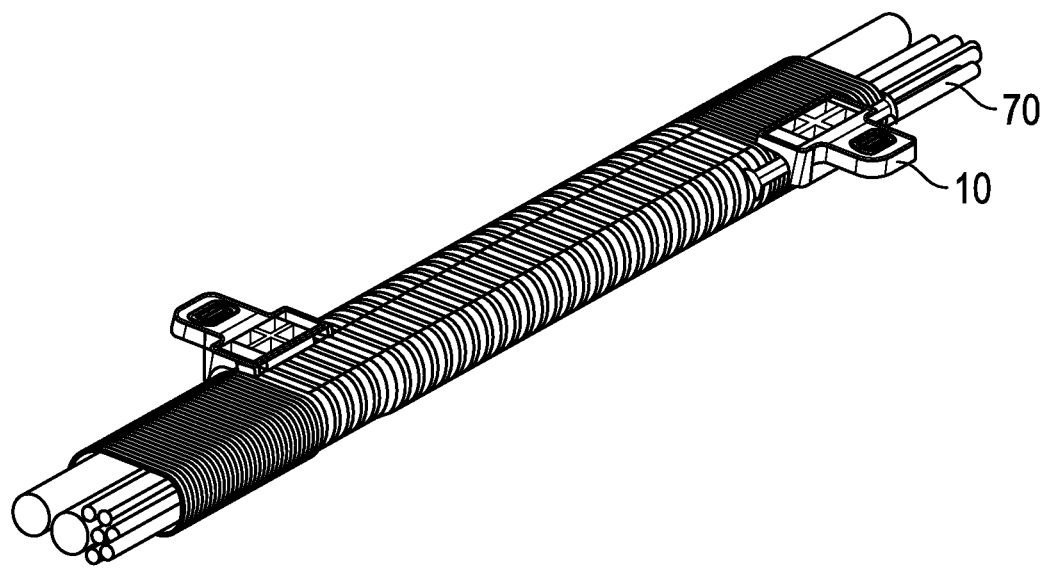
FIG. 1C illustrates a side perspective view of an apparatus attached to a wire assembly according to an example embodiment.

In further embodiments, the retainer body 15 may be configured (e.g., sized and shaped) to accommodate different sizes, numbers, or types of wire assemblies, wires, tubes, cables etc. In this regard, in some embodiments, the retainer body 15 is configured to retain a wire assembly and/or one or more wires comprising a plurality of diameters as shown in FIGS. 1B and 1C. In an example embodiment, the plurality of diameters may result in cross sections ranging from 10 mm$^2$ (square millimeters) to 70 mm$^2$ in area.

The retainer body 15 is structured to attach to a wire assembly via a plurality of types of binding attachments as shown in FIGS. 1B and 1C. For example, in the illustrated example, the retainer body 15 and the elongated arms 20 are structured to attach to a wire assembly via a plurality of types of binding attachments comprising a first type of attachment and a secondary type of attachment. For example, the first type of attachment may be tie wraps. The tie wraps may be made of nylon or other material and may have a flexible tape section with teeth that engage with a pawl in a head of the tie wrap to form a ratchet. As such, as the free end of the tape section is pulled, the tie-wrap tightens and does not come undone. The second type of attachment may be an attachment by tape or other flame retardant adhesive wrapped around the elongated arms 21. In some embodiments, the retainer body 15 may be structured to attach to a wire assembly via either the first type of attachment or by the second type of attachment or by both.

Figure 3:
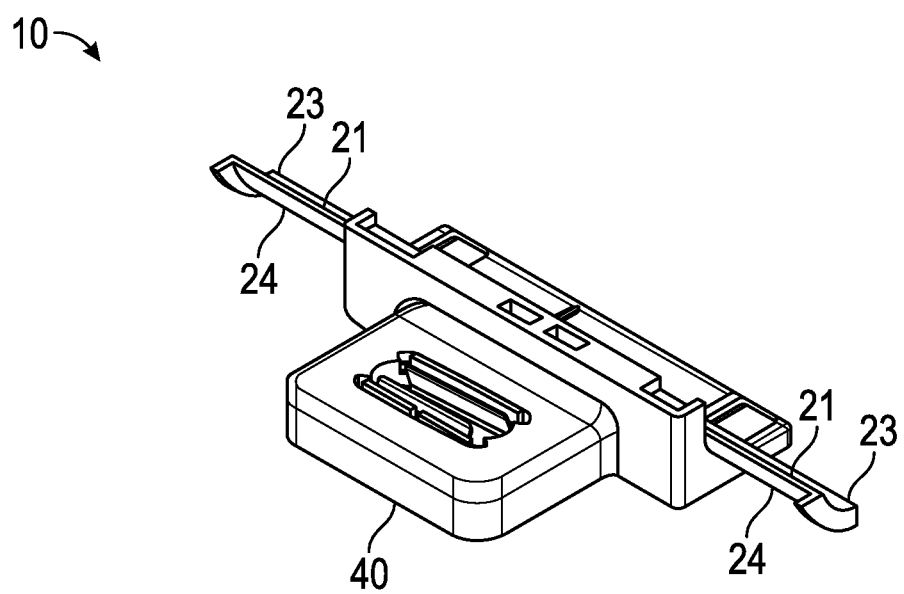
FIG. 3 illustrates a side perspective view of an apparatus according to an example embodiment.

The apparatus 10 as illustrated includes first and second elongated arms 21. The first and second elongated arms 21 may be structured to extend from the retainer body 15. In some embodiments, the first and second elongated arms 21 may be structured to facilitate, via a plurality of binding attachments, attachment of the retainer body 15 to a wire harness. The first and second elongated arms 21 may comprise arm walls 23 as illustrated with reference to FIG. 3. The arm walls 23 may be disposed perpendicular to each respective first and second elongated arm 21. In the example embodiment as depicted, the first and second elongated arms 21 and the arm walls 23 may form lips 24. In this regard, a wire assembly may be secured via a plurality of attachments corresponding to a plurality of fasteners. For example, a plurality of fasteners (e.g., tie wrap, tape, a combination thereof, etc.), may be placed around (e.g., looped around, bent around, etc.) the first and second elongated arms 16. In turn, the lips 24 may retain at least one of the plurality of fasteners or the wire assembly to the first and second elongated arms 21 of the apparatus 10. To that end, the lips 24 may prevent the plurality of fasteners from sliding off or otherwise becoming disengaged from the first and second elongated arms 21.

With reference back to FIG. 1A, as depicted, the apparatus 10 includes a retainer portion 40 structured to define an ovate passage 42. In this regard, the retainer portion 40 is configured to receive, via the ovate passage 42, a protrusion (not shown) as described herein below. The retainer portion 40 extends from the retainer body 15 forming angles, at or near, 90° (degrees) with the first and second elongated arms 21. In some embodiments, the retainer portion 40 may be structured to form angles less than 90° or greater than 90° with the first and second elongated arms 21. In other example embodiments, the retainer portion 40 may be coupled to the retainer body 15 via one or more fasteners (e.g., one or more screws, joints, adhesives, etc.) Though the retainer portion 40, in the embodiment illustrated, comprises a rectangular formation, the retainer portion 40 may comprise a square, circular, or any other suitable formation. The retainer portion 40 may be made of material plastic or a composite material. For example, the retainer portion 40 may comprise injection molded non-conductive plastic. Further description with respect to the retainer portion 40 is described herein with reference to FIG. 4.

As depicted, the apparatus 10 includes the first and second capture flanges 30 (e.g., flanges configured to lock or secure) structured to extend via an ovate passage 42. The first and second capture flanges 30 may be configured to secure a protrusion (not shown) received through the ovate passage 42. The protrusion may comprise a stud, nail, screw, or other type of mechanical faster. In some embodiments, the protrusion (e.g., a stud) may be coupled to a vehicular surface (e.g., a surface of, or corresponding to, a vehicle operable via at least one of a motor or engine). To that end, the first and second capture flanges 30 are configured for a first secure attachment to the protrusion coupled to the vehicular surface. For example, the first and second capture flanges 30 may be configured for a first secure attachment such as, but not limited to, locking the protrusion (e.g., a stud) to temporarily secure the protrusion prior to applying a fastener (e.g., a nut, bolt, or other type of mechanical fastener). In this regard, the first and second capture flanges 30 are operable to move (e.g., expand, collapse, or otherwise adjust) between a first position (e.g., a non-engaged state, resting state, free state, unoccupied state, etc.) and a second position (e.g., an engaged state, expanded state, etc.). Accordingly, the first and second capture flanges 30 may be operable to move from the first position (e.g., the non-engaged state) to the second position (e.g., the engaged state) in response to retaining (e.g., receiving) one or more protrusions (e.g., a stud).

In some embodiments, the first and second capture flanges 30 may be structured to retain one or more protrusions comprising a plurality of diameters. For example, the one or more protrusions may range in size or diameter. The first and second capture flanges 30 may be made of material such as plastic, rubber or composite material configured for flexible motion, extended motion, etc.

Figure 2A:
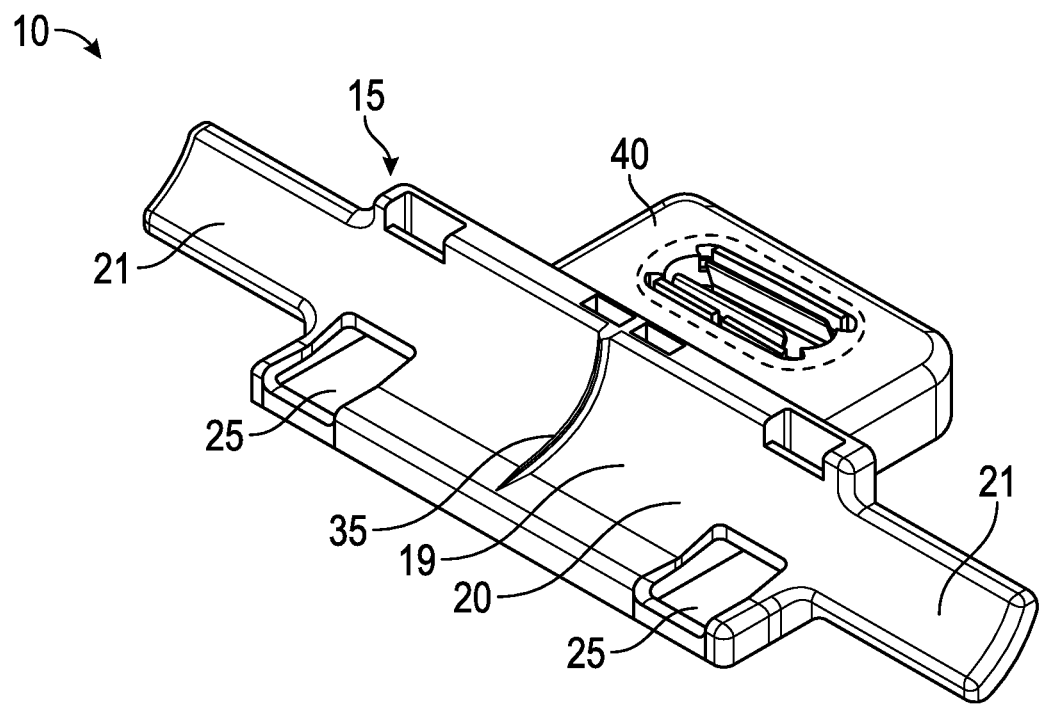
FIG. 2A illustrates a front perspective view of an apparatus according to an example embodiment.

With reference to FIG. 2A, a front perspective view of the apparatus 10 is illustrated according to an example embodiment. As depicted previously, the apparatus 10 comprises the retainer body 15, the central portion 19, the concave surface 20, the first and second elongated arms 21, the receiver passages 25, the one or more raised portions 35, and the retainer portion 40.

As more clearly depicted in FIG. 2A, the retainer body 15 includes a central portion 19 configured to support the retention of the wire assembly. The first and second elongated arms 21, as depicted, are structured to extend from the central portion 19. The central portion 19 may be made of material such as plastic or a composite material. For example, in the depicted embodiment, the central portion 19 comprises an injection molded non-conductive plastic. As will be appreciated, the central portion 19 may be made of a like or different material as the material forming the retainer body or any other components or portions thereof.

Figure 2B:
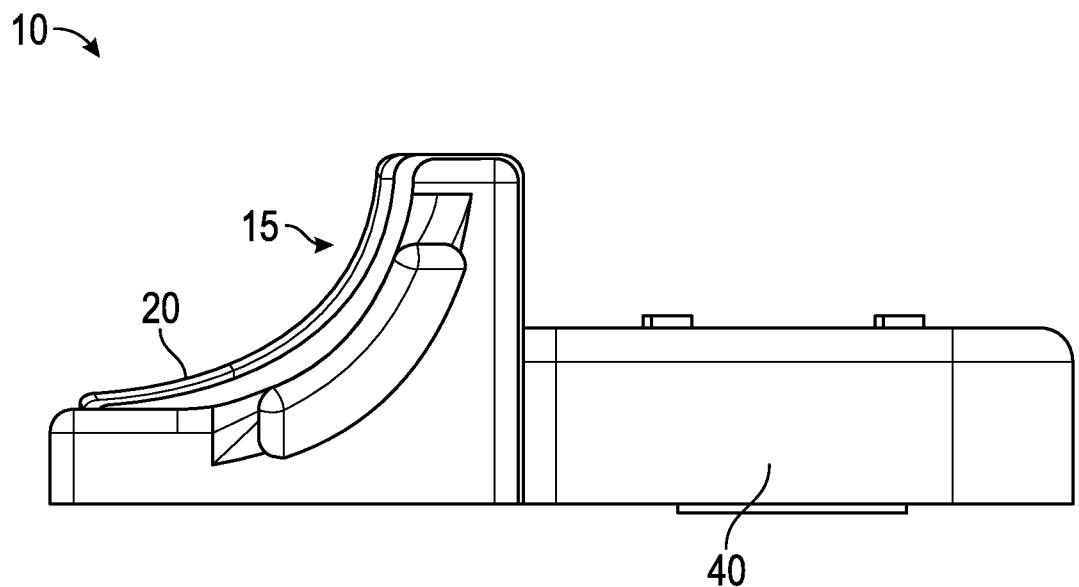
FIG. 2B illustrates an exploded side view of an apparatus according to an example embodiment.

The apparatus 10 as illustrated comprises a concave surface 20 to receive the wire assembly. (An exploded view of the concave surface 20 according to one embodiment is shown in FIG. 2B.) For example, the wire assembly may be placed into the concave surface 20 or otherwise provided and, thereby, coupled to the concave surface 20. Although a concave surface 20 is depicted, the apparatus 10 may include a convex (e.g., a surface structured to curve outward) or any other type of surface structured to receive a wire assembly.

As depicted, the retainer body 15 is structured to define a plurality of receiver passages 25 (e.g., receiving cavities).

The plurality of receiver passages 25 are structured to receive a plurality of fasteners corresponding to the plurality of binding attachments. For example, the plurality of receiver passages 25 may be structured to receive a plurality of tie wraps (not shown) which may pass through the plurality of receiver passages. The plurality of fasteners may then secure (e.g., by looping or wounding around) the apparatus 10 to the wire assembly. Although two receiver passages 25 are illustrated, the apparatus 10 may include, in some embodiments, any number of receiver passages 25 necessary to receive a plurality of fasteners. As illustrated, the plurality of receiver passages 25 are disposed within, or otherwise defined by, the central portion 19. In further embodiments, the plurality of receiver passages 25 may be defined by other portions or components of the apparatus 10. For example, the plurality of receiver passages 25 may be defined by the first and second elongated arms 21.

In the embodiment as illustrated, the retainer body 15 comprises one or more raised portions 35 structured to prevent the wire assembly from an unstable motion (e.g., a slipping motion). The one or more raised portions 35 may comprise one or more raised bands, ridges, or other raised protrusions. For example, the one or more raised portions 35 may prevent the wire assembly, or otherwise the wires, from moving in a parallel direction with respect to the apparatus 10. In so doing, the one or more raised portions 35 provides traction, slip-resistance, etc. to prevent the wire assembly from an unstable motion.

Figure 4:
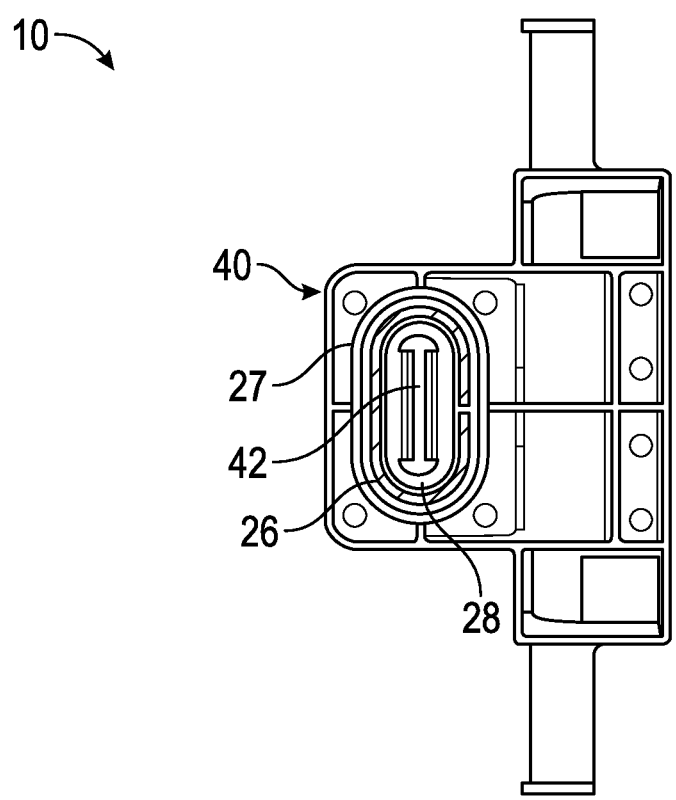
FIG. 4 illustrates a rear view of an apparatus according to an example embodiment; and It will be recognized that some or all of the figures are schematic representations for purposes of illustration. The figures are provided for the purpose of illustrating one or more implementations with the explicit understanding that they will not be used to limit the scope or the meaning of the claims.

With respect to FIG. 4, a rear view of an apparatus 10 is illustrated according to an example embodiment. As described above, the apparatus 10 includes a retainer portion 40 structured to define an ovate passage 42. The ovate passage 42 is structured to receive one or more protrusions comprising various shapes and/or sizes. For example, the ovate passage 42 may receive protrusions comprising round, oval, or other shapes.

The ovate passage 40 comprises one or more ovate walls as illustrated. The one or more ovate walls may comprise the inner wall 28, the intermediate wall 26, and the outer wall 27. The intermediate wall 26 is disposed between the inner wall 28 and the outer wall 27. The one or more ovate walls may comprise at least one of a metallic material, polymer material, composite material, or other material. For example, the intermediate wall 26, as illustrated, comprises a metal structured to support the retention of the protrusion (e.g., a stud comprising sheet metal protruding from a vehicular surface).

As described above, the first and second capture flanges 30 extend via the ovate passage 42. In the embodiment depicted, the first and second capture flanges 30 are structured to extend from the inner wall 28. Alternatively or additionally, the first and second capture flanges 30 may be structured to extend from the intermediate wall 26, the outer wall 27, or any other suitable wall. Although two capture flanges 30 are depicted, any number of capture flanges be structured to extend from one or more ovate walls.

While this specification contains many specific embodiment details, these should not be construed as limitations on the scope of what may be claimed, but rather as descriptions of features specific to particular embodiments. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

It is important to note that the construction and arrangement of the system shown in the various exemplary embodiments is illustrative only and not restrictive in character. All changes and modifications that come within the spirit and/or scope of the described embodiments are desired to be protected. It should be understood that some features may not be necessary and embodiments lacking the various features may be contemplated as within the scope of the application, the scope being defined by the claims that follow. When the language "at least a portion" and/or "a portion" is used the item can include a portion and/or the entire item unless specifically stated to the contrary.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A wire assembly securement apparatus, comprising:
a retainer body configured to attach, via a plurality of binding attachments, to a wire assembly;
first and second elongated arms structured to:
extend from the retainer body; and
facilitate, via the plurality of binding attachments, attachment of the retainer body to the wire assembly;
a retainer portion having a passage formed therein, the passage being configured to receive a protrusion, the passage being defined by a retainer wall that circumscribes the passage; and
first and second capture flanges, each of the first and second flanges including an outer end and an inner end, the outer ends of each of the first and second flanges each being attached along the retainer wall and the inner ends of each of the first and second flanges defining free ends that extend into the passage, the first and second capture flanges being configured to move from a first position to a second position, different than the first position, to secure the securement apparatus to the protrusion;
wherein the free end of the first flange is separated from the free end of the second flange by a first distance in the first position, and the free end of the first flange is separated from the free end of the second flange by a second distance in the second position, the first distance being different than the first distance; and wherein the outer end of the first flange is separated from the outer end of the second flange by the same distance in each of the first position and the second position.

2. The apparatus of claim 1, wherein the retainer body and first and second elongated arms are structured to attach to the wire assembly via a plurality of types of binding attachments comprising a first type of attachment and a secondary type of attachment.

3. The apparatus of claim 2, wherein the first type of attachment is a tie wrap attachment and wherein the second type of attachment is a tape attachment.

4. The apparatus of claim 3, wherein the retainer body has a plurality of receiver passages formed therein configured to receive tie wraps.

5. The apparatus of claim 1, wherein the retainer body is configured to retain a plurality of wires having a plurality of diameters.

6. The apparatus of claim 1, wherein the retainer wall is defined by one or more ovate walls.

7. The apparatus of claim 6, wherein the one or more ovate walls comprises at least one of a metallic material, a polymer material, and a composite material.

8. The apparatus of claim 1, wherein the retainer body comprises a concave surface.

9. The apparatus of claim 1, wherein the retainer body comprises one or more raised portions structured to prevent the wire assembly from an unstable motion.

10. The apparatus of claim 1, wherein the first and second capture flanges are configured to temporarily secure the securement apparatus to the protrusion.

11. The apparatus of claim 1, wherein the first and second capture flanges are operable to retain protrusions having a plurality of diameters.

12. A wire assembly securement apparatus, comprising:
a retainer body configured to attach, via a plurality of binding attachments, to a wire assembly, the retainer body extending between a first side surface and a second side surface and further comprising:
a first wall having a first end and a second end and extending between the first and second side surfaces;
a second wall having a first end and a second end and extending between the first and second side surfaces, wherein the first end of the first wall is located adjacent the first end of the second wall; and
a generally concave wall extending between the second end of the first wall and the second end of the second wall;
first and second elongated arms structured to:
extend from the retainer body, wherein the first elongated arm extends from the first side surface of the retainer body and the second elongated arm extends from the second side surface of the retainer body; and
facilitate, via the plurality of binding attachments, attachment of the retainer body to the wire assembly;

a retainer portion having a passage formed therein, the passage being configured to receive a protrusion; and wherein the retainer body comprises a first receiver passage extending through a portion of at least one of the first wall and the second wall at a location adjacent the first side surface of the retainer body and a second receiver passage extending through a portion of at least one of the first wall and the second wall at a location adjacent the second side surface of the retainer body; and wherein the first and second receiver passages and the first and second elongated arms are structured to attach to the wire assembly via a plurality of types of binding attachments comprising a first type of attachment and a secondary type of attachment, and wherein the first type of attachment is a tie wrap attachment and wherein the second type of attachment is a tape attachment.

13. The apparatus of claim 12, further comprising first and second capture flanges, each of the first and second flanges including an outer end and an inner end, the outer ends of each of the first and second flanges each being attached along a retainer wall circumscribing the passage formed in the retainer body, the inner ends of each of the first and second flanges defining free ends that extend into the passage;
wherein the first and second capture flanges are configured to move from a first position to a second position, different than the first position, to secure the securement apparatus to the protrusion;
wherein the first position comprises a resting state and the second position comprises an expanded state; and
wherein a distance as measured between the outer ends of the first and second flanges is the same in both the first and second positions.

14. The apparatus of claim 13, wherein the first and second capture flanges are configured to temporarily secure the securement apparatus to the protrusion.

15. The apparatus of claim 13, wherein the first and second capture flanges are operable to retain protrusions having a plurality of diameters.

16. The apparatus of claim 12, wherein the receiver passages are configured to receive tie wraps.

17. The apparatus of claim 12, wherein the retainer body is configured to retain a plurality of wires having a plurality of diameters.

18. The apparatus of claim 12, wherein the passage is defined by one or more ovate walls.

19. The apparatus of claim 12, wherein the one or more ovate walls comprises at least one of a metallic material, a polymer material, and a composite material.

20. The apparatus of claim 12, wherein the retainer body comprises one or more raised portions formed along and extending outwards from an outer surface of the concave wall, the one or more raised portions structured to prevent the wire assembly from an unstable motion.

* * * * *